(12) United States Patent
Merhav et al.

(10) Patent No.: US 10,459,901 B2
(45) Date of Patent: *Oct. 29, 2019

(54) EMBEDDED DEEP REPRESENTATION OF SOCIAL NETWORK TAXONOMY

(71) Applicant: LinkedIn Corporation, Sunnyvale, CA (US)

(72) Inventors: Uri Merhav, Rehovot (IL); How Jing, Sunnyvale, CA (US); Jaewon Yang, Sunnyvale, CA (US); Dan Shacham, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 225 days.

This patent is subject to a terminal disclaimer.

(21) Appl. No.: 15/360,547

(22) Filed: Nov. 23, 2016

(65) Prior Publication Data

US 2018/0144008 A1    May 24, 2018

(51) Int. Cl.
- *G06F 16/22* (2019.01)
- *G06F 16/21* (2019.01)
- *G06Q 50/00* (2012.01)

(52) U.S. Cl.
CPC ........ *G06F 16/2228* (2019.01); *G06F 16/217* (2019.01); *G06Q 50/01* (2013.01)

(58) Field of Classification Search
CPC ......... G06F 17/30321; G06F 17/30306; G06F 16/2228; G06F 16/217; G06Q 50/01
See application file for complete search history.

(56) References Cited

U.S. PATENT DOCUMENTS

2002/0188424 A1* 12/2002 Grinstein ............. G06K 9/6253 702/183
2010/0049770 A1*  2/2010 Ismalon ................ G06Q 30/02 707/765

(Continued)

FOREIGN PATENT DOCUMENTS

WO       2018097898 A1    5/2018

OTHER PUBLICATIONS

"International Application Serial No. PCT/US2017/054152, International Search Report dated Dec. 11, 2017", 2 pgs.

(Continued)

*Primary Examiner* — Robert W Beausoliel, Jr.
*Assistant Examiner* — Mohammad Solaiman Bhuyan
(74) *Attorney, Agent, or Firm* — Schwegman Lundberg & Woessner, P.A.

(57) ABSTRACT

In an example embodiment, for each of a plurality of different entities in a social network structure, the entity is mapped into a vector having n coordinates. The vector for each of the plurality of different entities is stored in a deep representation data structure. One or more objective functions are applied to at least one combination of two or more of the vectors in the deep representation data structure. Then, an optimization test on each of the at least one combination of two or more of the vectors is performed using a corresponding objective function output for each of the at least one combination of two or more of the vectors, and, for any combination that did not pass the optimization test, one or more coordinates for the vectors in the combination are altered so that the vectors in the combination become closer together within an n-dimensional space.

20 Claims, 11 Drawing Sheets

(56) References Cited

U.S. PATENT DOCUMENTS

| | | |
|---|---|---|
| 2015/0095080 A1 | 4/2015 | Gatti et al. |
| 2015/0370805 A1* | 12/2015 | Jain .................... G06F 17/3089 |
| | | 707/730 |
| 2015/0371277 A1 | 12/2015 | Filiz et al. |
| 2016/0292643 A1 | 10/2016 | Rodriguez et al. |
| 2018/0144253 A1 | 5/2018 | Merhav et al. |

OTHER PUBLICATIONS

"International Application Serial No. PCT/US2017/054152, Written Opinion dated Dec. 11, 2017", 8 pgs.

Frome, "DeViSE: A Deep Visual-Semantic Embedding Model", In Proceedings of Advances in Neural Information Processing Systems, (Dec. 5, 2013), 9 pgs.

Guy, "Mining expertise and interests from social media", In: Proceedings of the 22nd international conference on World Wide Web, [Online]. Retrieved from the Internet: https://www.researchibm.com/haifa/dept/imt/papers/GuyWWW13.pdf, (May 17, 2013).

"International Preliminary Report on Patentability Issued in PCT Application No. PCT/US17/054152", dated Jun. 6, 2019, 10 Pages.

* cited by examiner

EMBEDDED DEEP REPRESENTATION OF SOCIAL NETWORK TAXONOMY

TECHNICAL FIELD

The present disclosure generally relates to computer technology for solving technical challenges in analyzing taxonomy data in social network. More specifically, the present disclosure relates to an embedded deep representation of a social network taxonomy.

BACKGROUND

The rise of the Internet has occasioned two disparate phenomena: the increase in the presence of social networks, with their corresponding member profiles visible to large numbers of people, and the increase in the use of these social networks to perform searches for people and companies. It is common for various attributes of member (e.g., person or company) profiles to be standardized based on entities in various taxonomies. For example, an industry may be listed for a company, with the industry being selected from among a number of entries in an industry taxonomy, namely a data structure maintained by the social networking service. This industry taxonomy may include a hierarchical organization of possible industries. For example, an industry category of "Information Technology" in the industry taxonomy may have sub-categories of "Computer Software", "Computer Hardware", and "Computer Networking". The industry taxonomy may organize the sub-categories as children of a parent node corresponding to "Information Technology." There may be many layers of categories and subcategories in the industry taxonomy.

Industry, of course, is only one example of a member attribute that can be assigned to an entity in a taxonomy. Other examples include job title, school, skills, and so on.

While pure standardization of attributes into taxonomy entities works well when attributes are being considered in a vacuum, this type of organizational technique creates a technical challenge when it comes to relationships between the attributes. Taxonomies are typically created and managed by people who make subjective decisions as to where entities reside in the taxonomy. While the hierarchical nature of taxonomies do allow for some relationships to be established between entities, this relationship is static and standardized. For example, in a location taxonomy, "Los Angeles", "Silicon Valley", and "Seattle" may be considered to be part of a "West Coast" category, such that a "Los Angeles" node, "Silicon Valley" node, and "Seattle" node are all child nodes of a "West Coast" node. However, in this case, each of the child nodes are equidistant from each other, thus failing to capture the relationships between the child nodes. These relationships can be dynamic and may vary depending upon a desired analysis. For example, in some analyses, the physical distances between the locations might be relevant, whereas in some analyses, other, more subtle relationships between the cities may be relevant. For example, Los Angeles is closer in distance to Silicon Valley than Seattle is, yet if one is attempting to predict a likely city that a computer programmer living in Silicon Valley would move to, Seattle may be far more likely (and thus may have a much closer relationship for this analysis) than Los Angeles. The bare taxonomy architecture does not have a mechanism to capture these types of dynamic and subtle relationships among entities.

Indeed, standardized data in taxonomies is often categorical and co-occur sparsely, which limits their usefulness for predictive tasks.

BRIEF DESCRIPTION OF THE DRAWINGS

Some embodiments of the technology are illustrated, by way of example and not limitation, in the figures of the accompanying drawings.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a system is provided whereby latent vector representations for entities in a taxonomy are learned through machine learning techniques. Ultimately, every skill, title, or other standardized entity may be mapped to a vector representation, where "distance" is a well-defined quantity (e.g., Euclidean) and "relation" well defined as well (e.g., the subtraction of the two vectors).

In an example embodiment, a machine learning algorithm is utilized to optimize embeddings. An embedding is a value assigned to an entity based on an objective. Specifically, all entities are initially assigned a random embedding. Then, progressively, these embeddings are modified to maximize a stated objective. The objective will differ based on the problem being analyzed.

Such an approach allows difficult standardization tasks to be analyzed, such as clustering similar entities, synonym identification and retrieval tasks, seniority relations, relevance relations, identifying analogies, outlier identification, and prediction tasks such as predicting job transitions applications, or string searches.

Finding a high dimensional representation for all entities ultimately involves deciding on an objective function, which is the goal that the representation is attempting to accomplish, and then optimizing the representation to improve performance on the objective. For example, a good vector embedding for titles should be able to predict both title transitions and title similarity using a learner in the embedded space.

Example objectives include:
(1) Predicting whether a member has a certain skill;
(2) Predicting whether a member is employed at a title or a certain company, using skills;
(3) Predicting transitions between jobs;
(4) Predicting users applying to jobs;
(5) Predicting users contacting other users;
(6) Predicting transition direction;
(7) Predicting which job titles are more senior than others.

Figure 1:
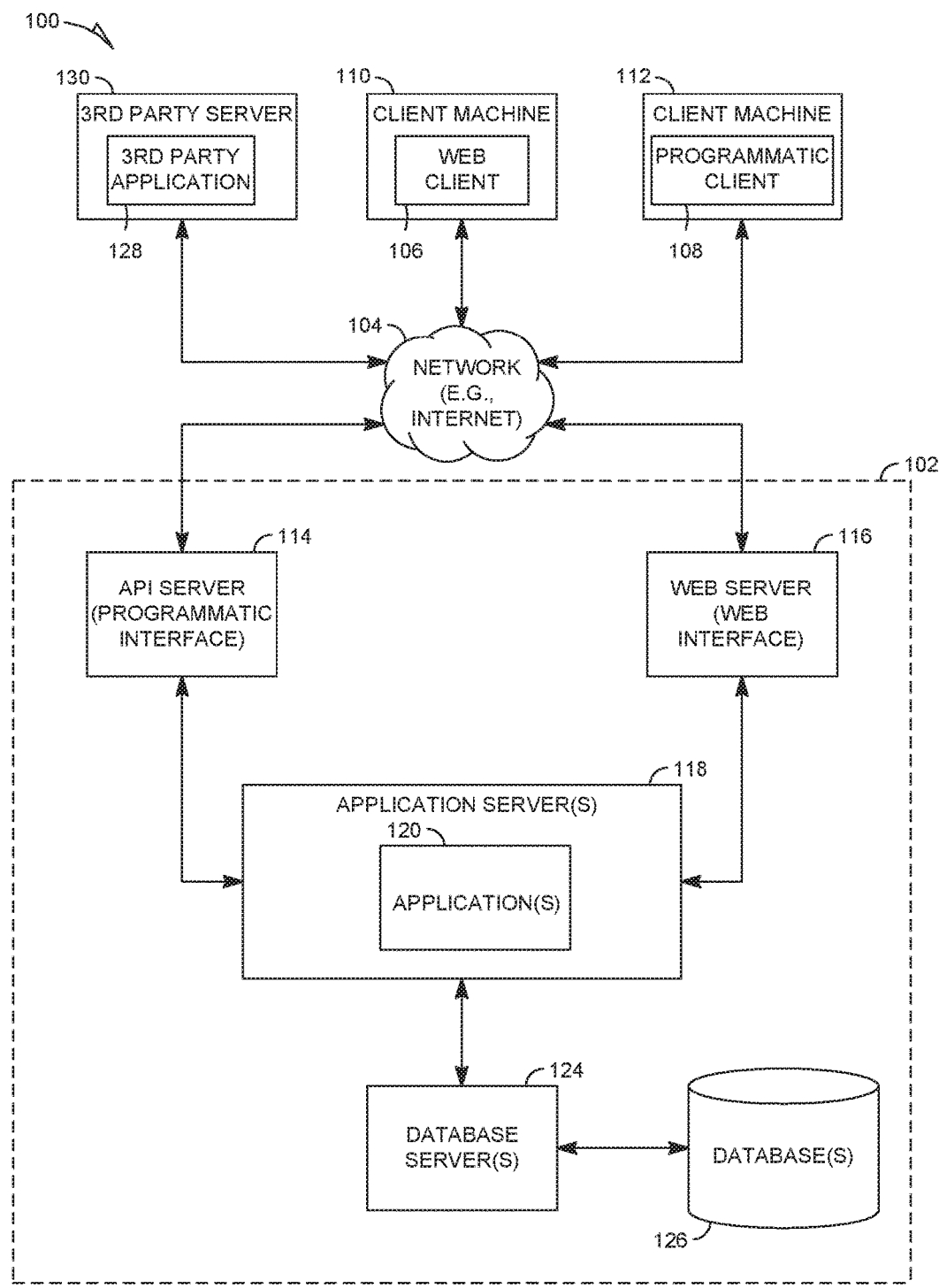
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the client machines 110, 112 and the third-party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
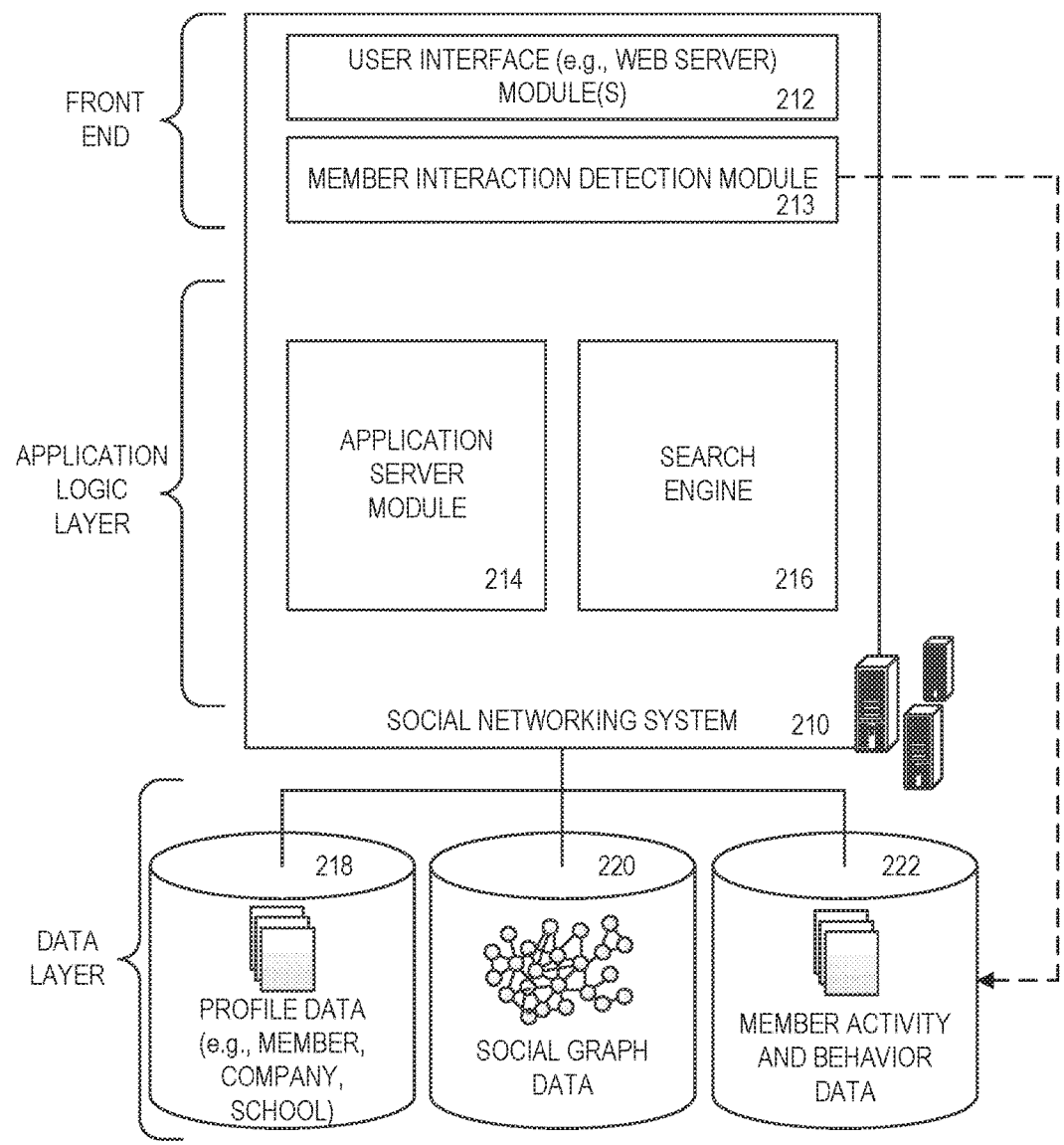
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with the different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birth date), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a member has provided information about various job titles that the member has held with the same organization or different organizations, and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile. This importation of organization data and enrichment of the data will be described in more detail later in this document.

Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, the concept of "following" another member typically is a unilateral operation and, at least in some embodiments, does not require acknowledgement or approval by the member who is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API module via which applications 120 and services can access various data and services provided or maintained by the social networking service. For example, using an API, an application 120 may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
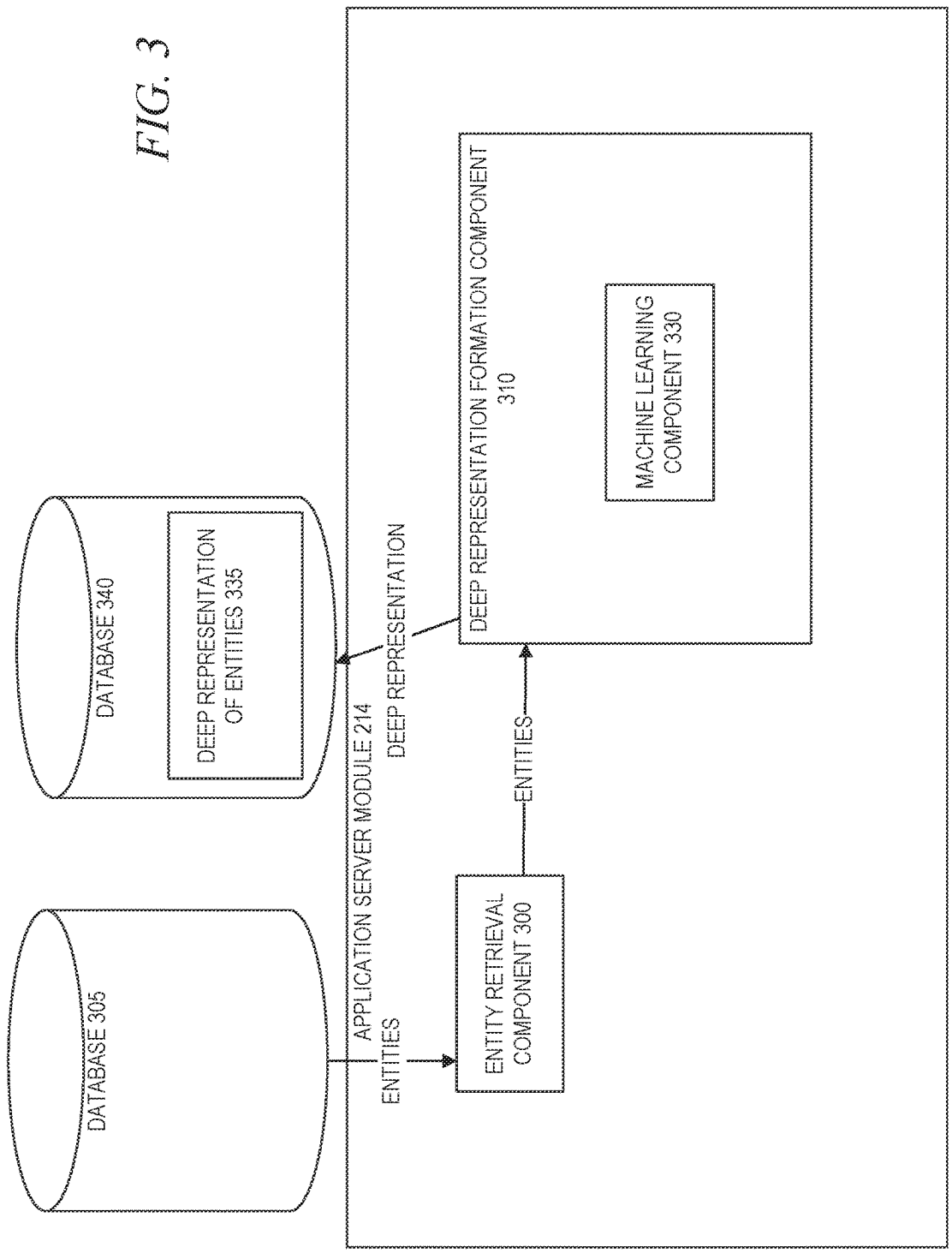
FIG. 3 is a block diagram illustrating the application server module of FIG. 2 in more detail.

FIG. 3 is a block diagram illustrating the application server module 214 of FIG. 2 in more detail. While in many embodiments the application server module 214 will contain many subcomponents used to perform various different actions within the social networking system 210, in FIG. 3 only those components that are relevant to the present disclosure are depicted. Here, an entity retrieval component 300 retrieves entities from a database 305. This may include, for example, important existing taxonomies. The entities, once extracted, are passed to a deep representation formation component 310, which acts to form a deep representation of the entities, as will be described in more detail later. This may include utilizing a machine learning component 330. Once formed, the deep representation of entities 335 may be stored in database 340. In some example embodiments, database 305 and database 340 are a single database.

As described earlier, in an example embodiment, every entity that could be mapped to a taxonomy in a social network may be mapped to a vector (a point in an arbitrary space). This mapping may be known as an embedding. The vector may include any number of dimensions. In an example embodiment, each entity is embedded to a vector having 128 dimensions. This means that every entity is mapped to a set of 128 coordinates. By arbitrary, this means that each dimension has no meaning in itself—they simply are a mechanism by which distance between entities may be measured. The specific starting values for each vector may be randomly assigned, and through a machine learning optimization process the starting values are altered over and over until a particular objective is optimized. It should be noted that it may be desirable to select at least enough dimensions as objectives to solve for, however this is not a requirement.

It should be noted that an entity as described herein is a specific instance of standardized data in the social network. Typically these entities will include pieces of data supplied in a member profile that is capable of being standardized. Common entities in social networking profiles include titles, industries, locations, skills, likes, dislikes, schools attended, etc. Certain types of data are less likely to be capable of being standardized, such as names, publications, etc.

The deep representation of entities may be a single representation for many different types of entities. For example, whereas in the prior art each entity type would be mapped into a hierarchy of entities just of that entity type, the deep representation of entities in the present disclosure allows for multiple entity types to be mapped into the same data structure, thus permitting enriched analyses and predictions based on the relationships between entities of different entity types.

Figure 4:
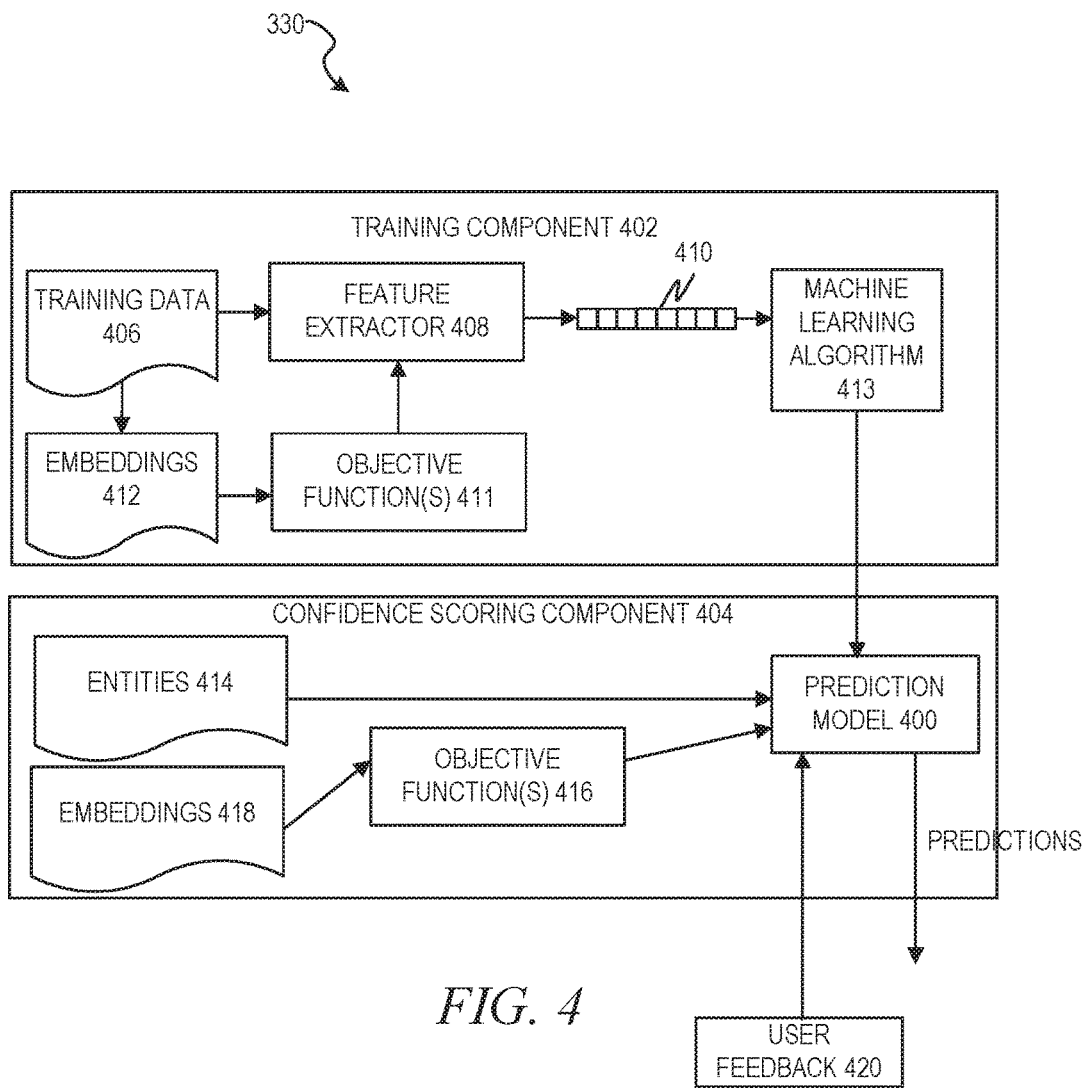
FIG. 4 is a block diagram illustrating a machine learning module in more detail, in accordance with an example embodiment.

In an example embodiment, one or more machine learning algorithms are used to aid in optimizing embedding used in the deep representation of entities. FIG. 4 is a block diagram illustrating a machine learning component 330 in more detail, in accordance with an example embodiment. The machine learning component 330 may utilize machine learning processes to arrive at a prediction model 400 used to provide a confidence score for a particular prediction. The exact prediction may vary based on the objective being selected. The machine learning component 330 may comprise a training component 402 and a confidence scoring component 404. The training component 402 feeds training data 406 comprising, for example, member profile data and member activity data into a feature extractor 408 that extracts one or more features 410 of the information. The training data 406 may also include output of an objective function 411 performed on embeddings 412 corresponding to the training data 406 (from, for example, the deep representation of entities, as will be described in more detail below). A machine learning algorithm 413 produces the prediction model 400 using the extracted features 410 and the output of the objective function 411. In some example embodiments, this involves the machine learning algorithm 413 learning weights to apply in the prediction model 400. In the confidence scoring component 404, one or more entities 414, as well as one or more outputs of objective function(s) 416 performed on embeddings 418 corresponding to the one or more entities 414, may be fed to the prediction model 400, which outputs a confidence score for each of one or more potential predictions, indicating a confidence level in the corresponding potential prediction.

It should be noted that the prediction model 400 may be periodically updated via additional training and/or user feedback 420. The user feedback 420 may be either feedback from members performing searches or from administrators. The user feedback 420 may include an indication about how successful the prediction model 400 is in providing accurate confidence scores.

The machine learning algorithm 413 may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, a multi-class logistical regression model is used.

As described above, the training component 402 may operate in an offline manner to train the prediction model 400. The confidence scoring component 404, however, may be designed to operate in either an offline manner or an online manner.

Figure 5:
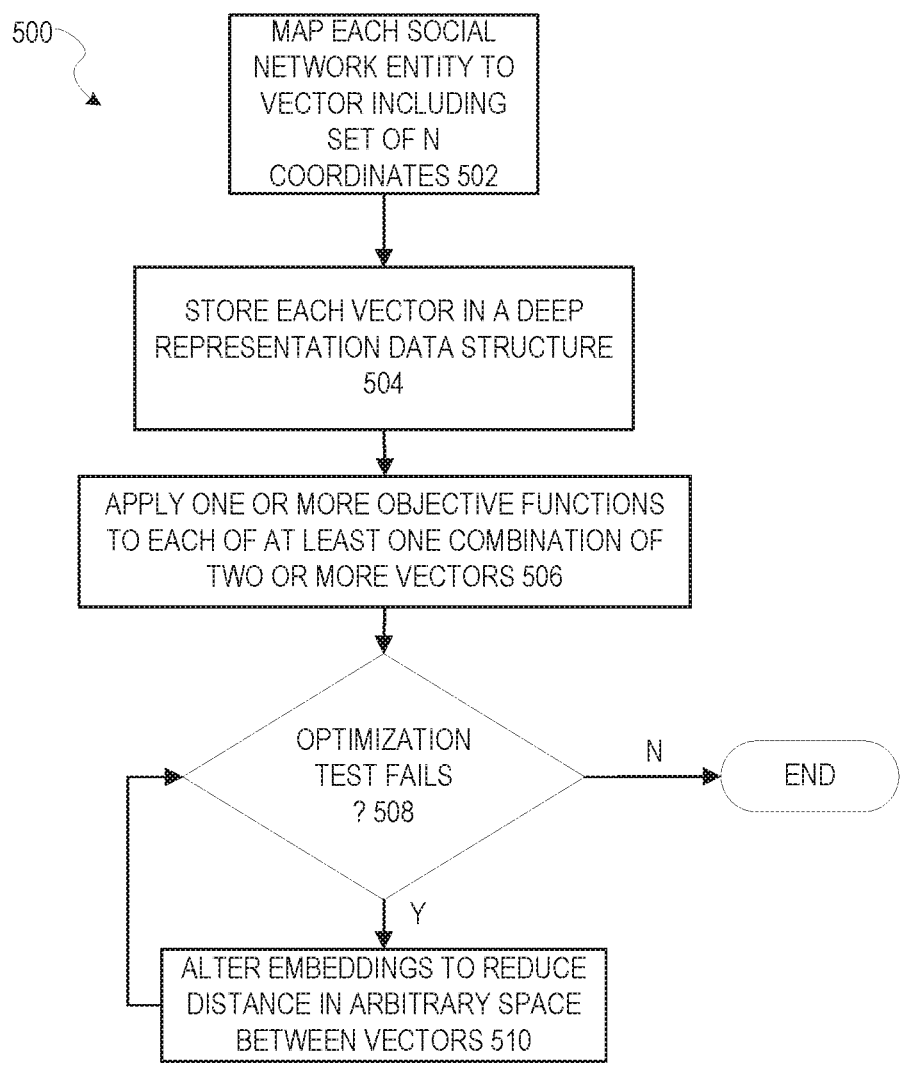
FIG. 5 is a flow diagram illustrating a method for creating a deep embedded representation of social network entities in accordance with an example embodiment.

FIG. 5 is a flow diagram illustrating a method 500 for creating a deep embedded representation of social network entities in accordance with an example embodiment. At operation 502, each of the social network entities is initially mapped to a vector including a set of n coordinates. As described above, in an example embodiment n is 128. Additionally, in an example embodiment this initial mapping is random, in that each of the n coordinates for an entity is selected using a random number generator or the like, designed to output a random number in an arbitrary space. This arbitrary space may be bounded on both sides. For example, the random number generator may generate a random number between 0 and 1 to one decimal place (e.g., 0.0, 0.1, 0.2, etc.).

At operation 504, each of these vectors may be stored in a deep representation data structure. The form of this data structure may vary based on implementation. In some example embodiments, the data structure may take the form of a matrix.

At operation 506, one or more objective functions are applied to each of at least one combination of two or more vectors. The objective function is selected based on the prediction that is attempting to be solved. For example, if the selected prediction that is attempting to be solved is whether a member of the social network having a particular title also has a certain skill, then the objective function may be a dot product function between vectors for title entities and vectors for skills entities. The result of the application of the objective function is an objective function output.

At operation 508, an optimization test is applied to each of the outputs of the objective function. The purpose of the optimization test is to determine whether the embeddings have been optimized. This determination may be based on whether a machine learning model would, if fed at least one of the vectors in the combination, be accurate in the selected prediction. For example, if, as above, the prediction that is attempting to be solved is whether a member of the social network having a particular title also has a certain skill, then the result of operation 506 (the dot product of the title entity and skill entity) should be at a maximum (e.g., 1.0) for members with the title also having the skill. Thus, a machine learning model is run using one of the entities represented by the vectors in the combination to determine if it would accurately predict the presence of the other vector(s).

For example, a member profile containing both the particular title and the certain skill could be fed to the machine learning model, the machine learning model having been trained based on the objective function output, and if the machine learning model accurately predicts that the member profile should contain the certain skill, then the optimization test passes. If not, it fails.

For each combination of vectors tested by the optimization test, if the optimization test fails, then at operation 510 the embeddings for the vectors are altered to reduce the distance in the arbitrary space between the vectors. Then the method 500 loops back to operation 508. Thus, this optimization loop continues until each combination of vectors analysed by the optimization test has passed the optimization test.

As described briefly earlier, in some example embodiments the method 500 is designed to optimize on multiple objectives simultaneously. There are a number of different techniques that could be utilized in order to accomplish this. In one example embodiment, embeddings are modified to minimize total error over both objectives. For example, if Objective function A outputs an error of X and Objective function B outputs an error of Y, then the method 500 can optimize the embeddings to minimize X+Y. While this technique works well for a few different objectives simultaneously, it tends not to work as well when the number of objectives increases (i.e., it does not scale well). This is because certain objective functions may generate bigger errors than others, leading to a bias in the optimization towards the functions that generate bigger errors.

Additionally, in one example embodiment, the precise objective to optimize on is not known a priori, and thus it may be desirable to optimize generally on a large number of different potential objectives simultaneously. In order to handle this, in an example embodiment, the optimization is automatically recalibrated periodically (e.g., every N iteration) such that weights assigned to each objective function are brought to the same order of magnitude. Other more manual techniques could be utilized in addition to, or in lieu of, the automatic technique described above, including plotting error function rates for both objectives in training to make sure they are within the same order of magnitude, manually interrupting training and changing the weights of the objectives, and manually inspecting results to make sure both objectives are improving.

Figure 6:
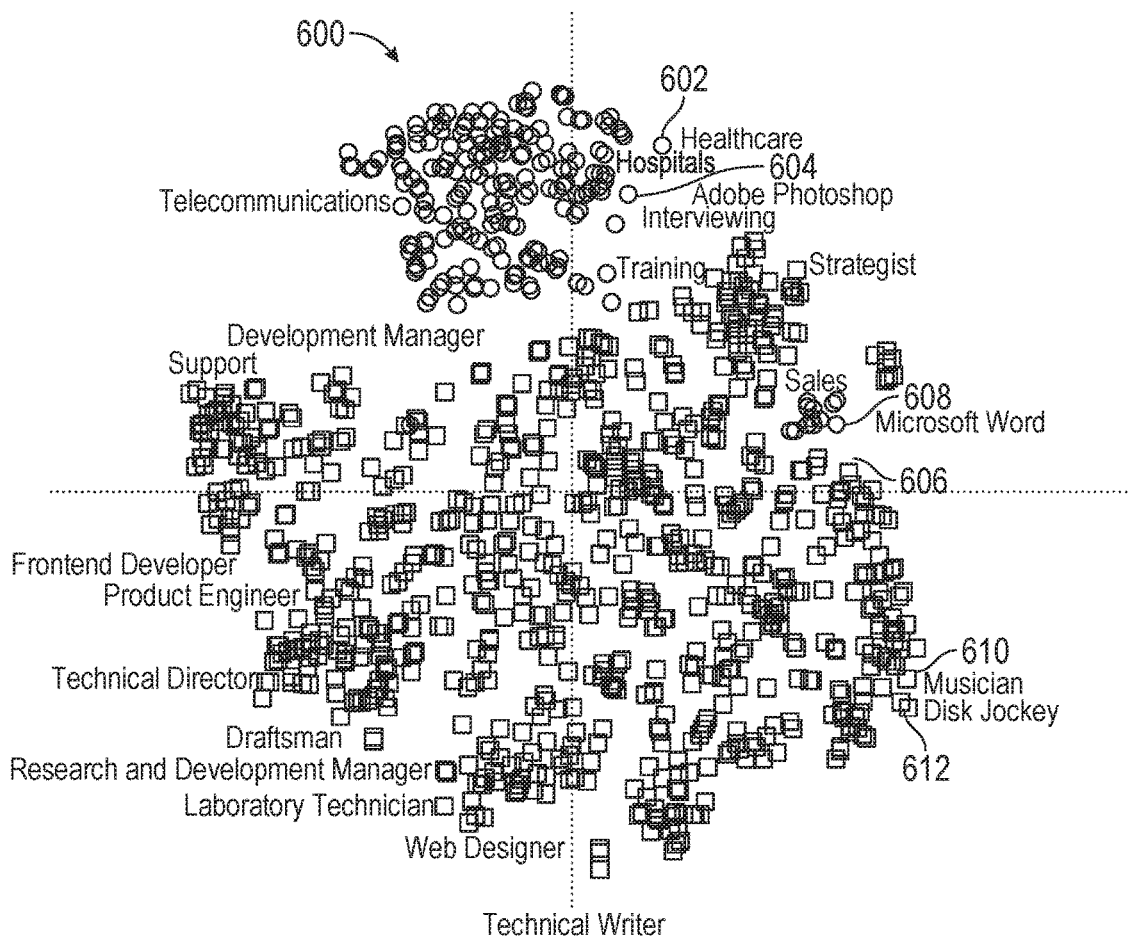
FIG. 6 is a diagram illustrating an example of a deep representation of titles and skills in accordance with an example embodiment.

In this manner, the old way of constructing a taxonomy for each entity type manually using subjective human analyses can be completely bypassed. Rather than individual hierarchical taxonomies, a deep representation for each entity may be provided that allows the type of advanced analyses described in this disclosure. FIG. 6 is a diagram illustrating an example of a deep representation 600 of titles and skills in accordance with an example embodiment. It should be noted that while in example embodiments a number of different coordinates (e.g., 128) are used for each entity, since it is impossible to visually depict 128 dimensions, for simplicity a T-SNE algorithm is used to visualize the vectors. Essentially every two data points that are close to each other in the vector space will end up close to each other in the T-SNE representation. As can be seen in this diagram, there are multiple entity types represented, including industries (e.g., healthcare 602), skills (e.g., Adobe Photoshop 604), and titles (e.g., Head of Marketing 606). Analysis of this deep representation 600 reveals, for example, that healthcare 602 is somewhat related to Adobe Photoshop 604, but less so to Microsoft Word 608. This is an example of the types of inter-entity-type relationships that can be reflected in the deep representation 600. Additionally, intra-entity relationships are also reflected in this deep representation 600. For example, the titles of musician 610 and disk jockey 612 are closer in distance and thus more related than, for example, musician 610 and draftsman.

Figure 7:
FIG. 7 is a diagram illustrating the example of the deep representation from FIG. 6 at a deeper lever (i.e., zoomed in).

FIG. 7 is a diagram illustrating the example of the deep representation 600 from FIG. 6 at a deeper lever (i.e., zoomed in). Here it can be seen that titles belonging to the same fields of expertise are indeed mapped close to each other.

Figure 8:
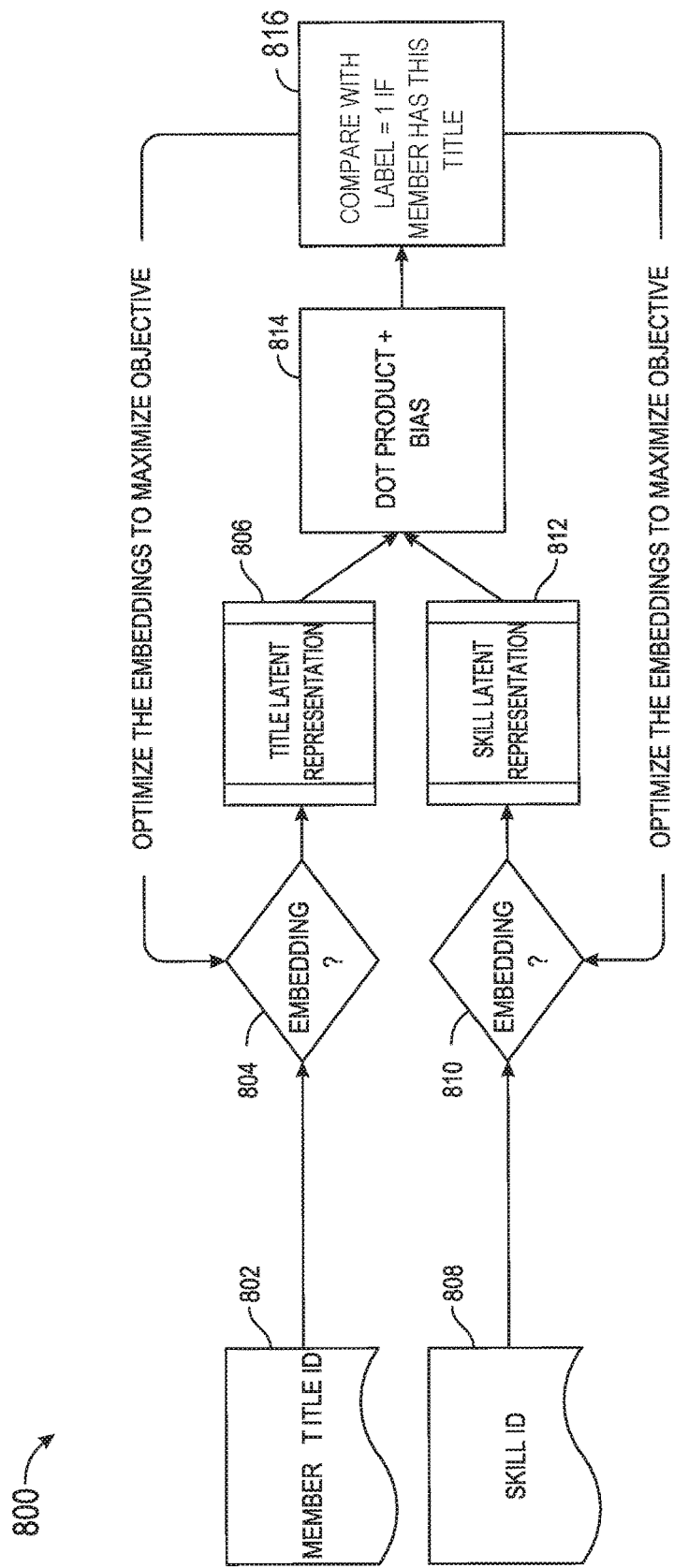
FIG. 8 is a flow diagram illustrating a method for creating a deep representation of entities specifically for relating titles and skills.

FIG. 8 is a flow diagram illustrating a method 800 for creating a deep representation of entities specifically for relating titles and skills. Here, titles and skills are embedded in a such a way that the dot product is maximized when the skill and title tend to co-occur, and minimized otherwise. A member title identification (entity) 802 is used for an embedding step 804, which outputs a title latent representation, specifically a vector 806 for the title. Likewise, a skill identification (entity) 808 is used for an embedding step 810, which outputs a skill latent representation for the skill, specifically a vector 812 for the skill. Vector 806 and vector 812 are then fed to an objective function 814, herein being a dot product operation plus a bias (e.g., addition or subtraction of a constant). Then an optimization test 816 is performed on the output of the objective function 814. Here the optimization test 816 includes comparing the output of the objective function 814 with a label of one for members that have the member title identification 802. If the optimization test 816 fails, then the embedding step 804 and embedding step 810 are repeated to maximize the objective (e.g., making the vectors 806, 812 closer to each other in the arbitrary space).

Figure 9:
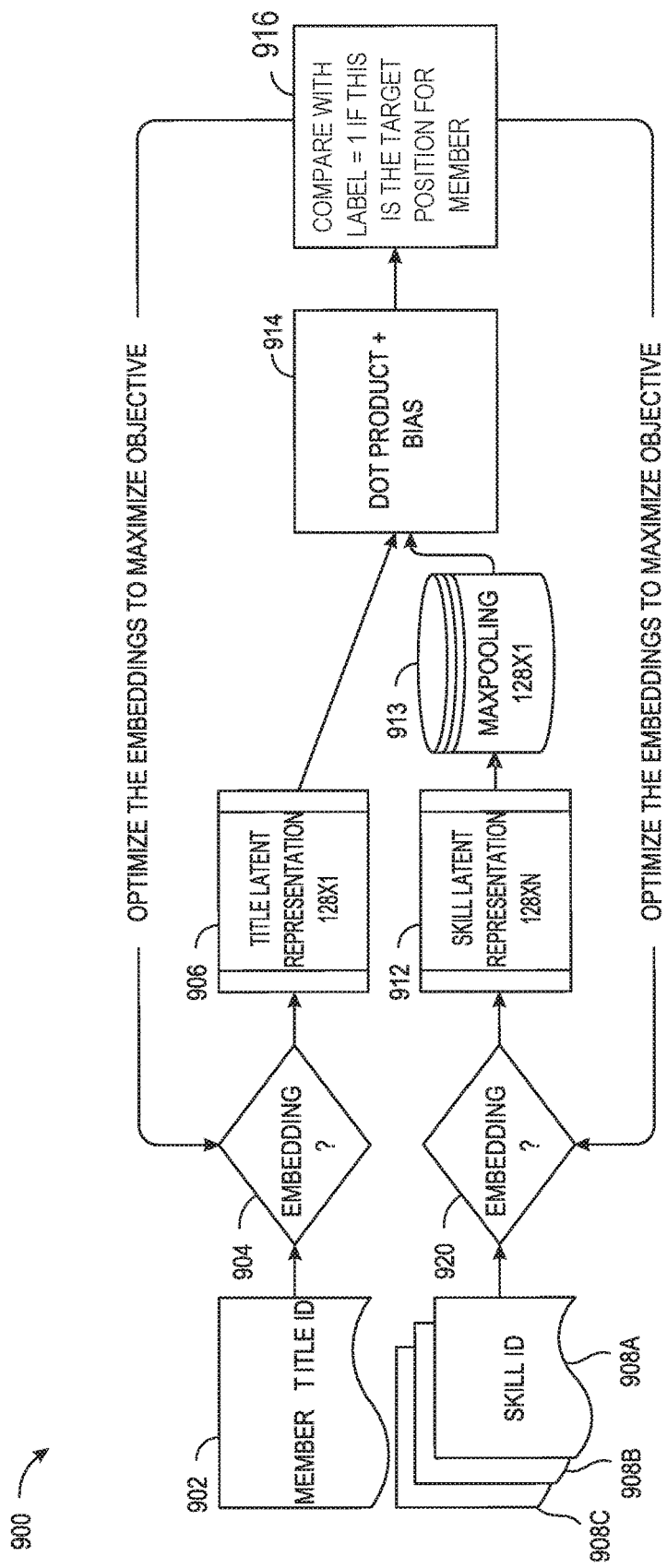
FIG. 9 is a flow diagram illustrating a method for creating a deep representation of entities specifically for skill-set-based title prediction.

FIG. 9 is a flow diagram illustrating a method 900 for creating a deep representation of entities specifically for skill-set-based title prediction. This model optimizes for an application known as title disambiguation. Specifically, some members may submit very broad titles (e.g., manager), and it can be useful to predict a more exact title identification given the set of skills the member has. The method 900 is similar to method 800, except that the task is used as a validation set to prevent embedding overfitting, the model needs to aggregate multiple skills, and since the task includes a validation set, regularization parameters are introduced.

A member title identification (entity) 902 is used for an embedding step 904, which outputs a title latent representation, specifically a vector 906 for the title. Likewise, multiple skill identifications (entities) 908A-908C are used for an embedding step 920, which outputs a skill latent representation of each skill, specifically vectors 912. Vectors 906 and 912 are then fed to an objective function 914, herein being a dot product operation plus a bias (e.g., addition or subtraction of a constant). Notably, however, vectors 912 may first be passed through a max pooling step 913.

Max pooling is a sample-based discretization process used in neural networks. The objective is to down-sample an input representation such as a vector, reducing its dimensionality and allowing for assumptions to be made about features contained in the sub-regions binned. This is done in part to help over-fitting by providing an abstracted form of the representation. It also reduces computational cost by reducing the number of parameters to learn, as well as providing basic translation invariance to the internal representation.

Then optimization test 916 is performed on the output of objective function 914. Here the optimization test 916 includes comparing the output of objective function 914 with a label of one for members that have the skill identifications 908A-908C. If the optimization test 916 fails, then the embedding step 904 and embedding step 920 are repeated to maximize the objective (e.g., making the vectors 906, 912 closer to each other in the arbitrary space).

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-9 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 10:
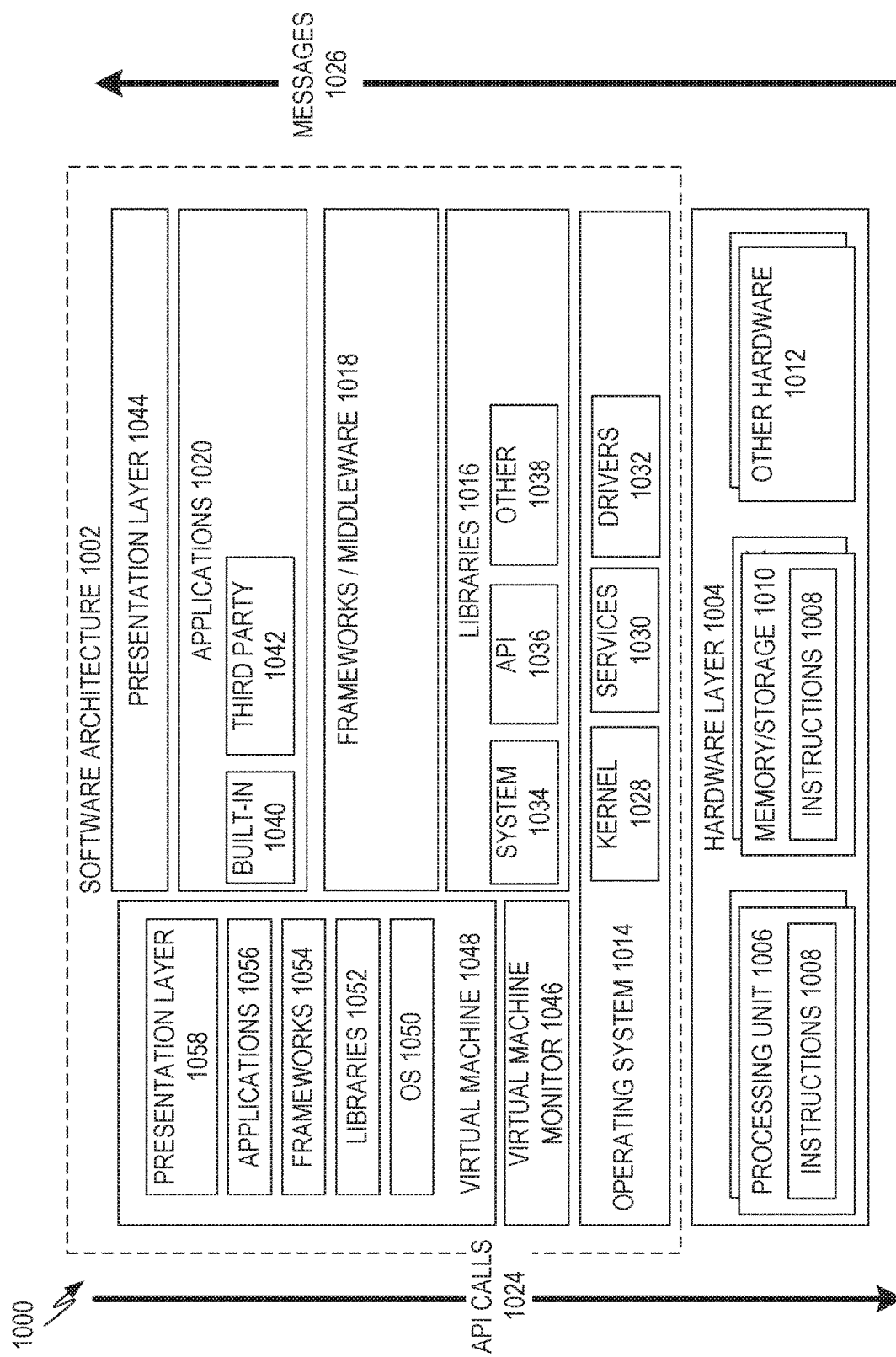
FIG. 10 is a block diagram illustrating a representative software architecture, which may be used in conjunction with various hardware architectures herein described.

FIG. 10 is a block diagram 1000 illustrating a representative software architecture 1002, which may be used in conjunction with various hardware architectures herein described. FIG. 10 is merely a non-limiting example of a software architecture, and it will be appreciated that many other architectures may be implemented to facilitate the functionality described herein. The software architecture 1002 may be executing on hardware such as a machine 1100 of FIG. 11 that includes, among other things, processors 1110, memory/storage 1130, and I/O components 1150. A representative hardware layer 1004 is illustrated and can represent, for example, the machine 1100 of FIG. 11. The representative hardware layer 1004 comprises one or more processing units 1006 having associated executable instructions 1008. The executable instructions 1008 represent the executable instructions of the software architecture 1002, including implementation of the methods, modules, and so forth of FIGS. 1-9. The hardware layer 1004 also includes memory and/or storage modules 1010, which also have the executable instructions 1008. The hardware layer 1004 may also comprise other hardware 1012, which represents any other hardware of the hardware layer 1004, such as the other hardware illustrated as part of the machine 1100.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and a presentation layer 1044. Operationally, the applications 1020 and/or other components within the layers may invoke API calls 1024 through the software stack and receive responses, returned values, and so forth, illustrated as messages 1026, in response to the API calls 1024. The layers illustrated are representative in nature and not all software architectures have all layers. For example, some mobile or special-purpose operating systems may not provide a layer of frameworks/middleware 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than by interfacing directly with the underlying operating system 1014 functionality (e.g., kernel 1028, services 1030, and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks 1018 (also sometimes referred to as middleware) may provide a higher-level common infrastructure that may be utilized by the applications 1020 and/or other software components/modules. For example, the frameworks 1018 may provide various graphic user interface (GUI) functions, high-level resource management, high-level location services, and so forth. The frameworks 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. The third-party applications 1042 may include any of the built-in applications 1040 as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1042 may invoke the API calls 1024 provided by the mobile operating system such as the operating system 1014 to facilitate functionality described herein.

The applications 1020 may utilize built-in operating system 1014 functions (e.g., kernel 1028, services 1030, and/or drivers 1032), libraries 1016 (e.g., system libraries 1034, API libraries 1036, and other libraries 1038), and frameworks/middleware 1018 to create user interfaces to interact with users of the system. Alternatively, or additionally, in some systems, interactions with a user may occur through a presentation layer, such as the presentation layer 1044. In these systems, the application/module "logic" can be separated from the aspects of the application/module that interact with a user.

Some software architectures utilize virtual machines. In the example of FIG. 10, this is illustrated by a virtual machine 1048. A virtual machine creates a software environment where applications/modules can execute as if they were executing on a hardware machine (such as the machine 1100 of FIG. 11, for example). A virtual machine is hosted by a host operating system (e.g., operating system 1014 in FIG. 10) and typically, although not always, has a virtual machine monitor 1046, which manages the operation of the virtual machine 1048 as well as the interface with the host operating system (e.g., operating system 1014). A software architecture executes within the virtual machine 1048, such as an operating system 1050, libraries 1052, frameworks/middleware 1054, applications 1056, and/or a presentation layer 1058. These layers of software architecture executing within the virtual machine 1048 can be the same as corresponding layers previously described or may be different.

Example Machine Architecture and Machine-Readable Medium

Figure 11:
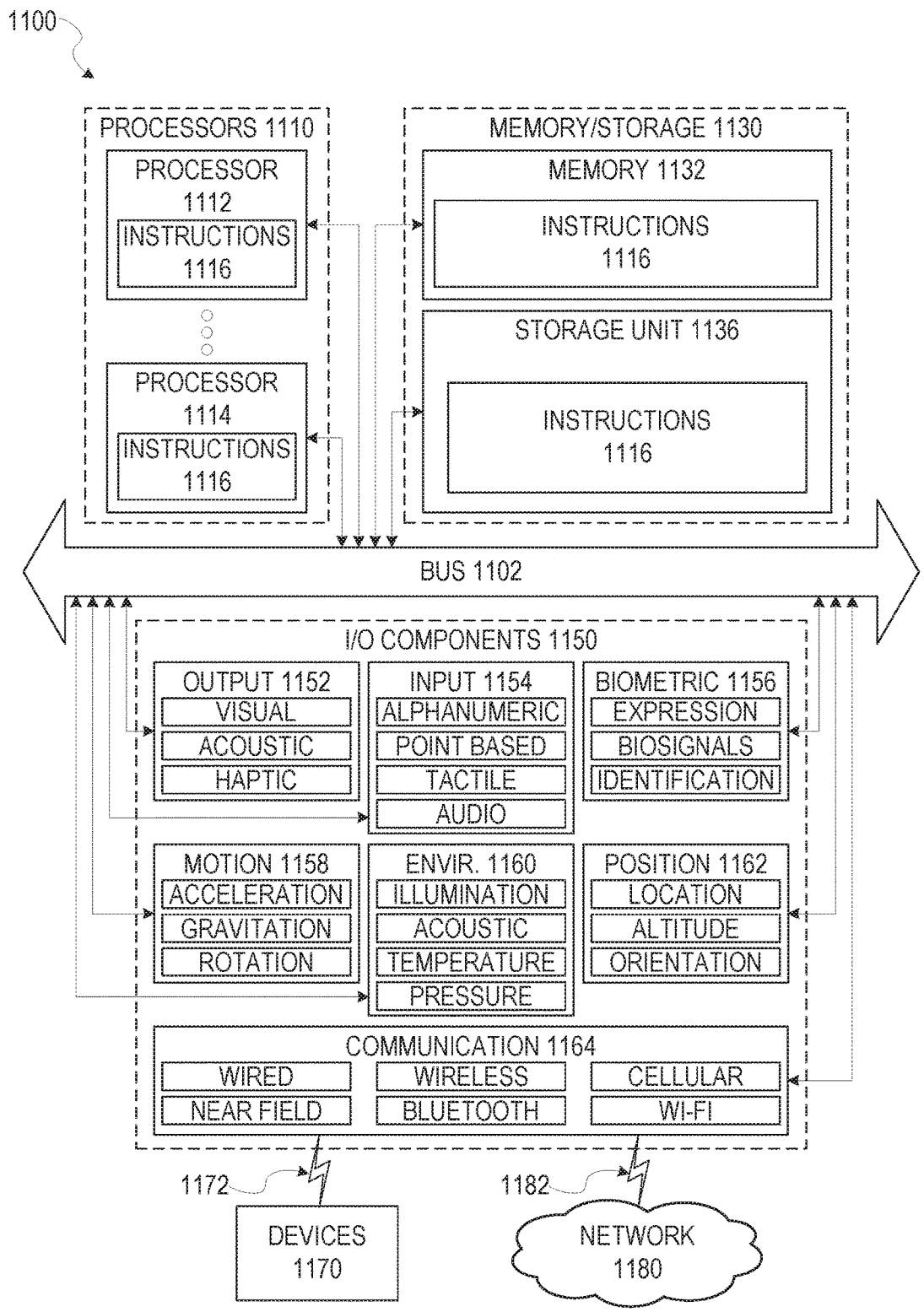
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. The instructions 1116 transform the general, non-programmed machine into a particular machine programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory/storage 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions contemporaneously. Although FIG. 11 shows multiple processors 1110, the machine 1100 may include a single processor with a single core, a single processor with multiple cores (e.g., a multi-core processor), multiple processors with a single core, multiple processors with multiples cores, or any combination thereof.

The memory/storage 1130 may include a memory 1132, such as a main memory, or other memory storage, and a storage unit 1136, both accessible to the processors 1110 such as via the bus 1102. The storage unit 1136 and memory 1132 store the instructions 1116 embodying any one or more of the methodologies or functions described herein. The instructions 1116 may also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of the processors 1110 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine (e.g., processors 1110), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or other suitable device to interface with the network 1180. In further examples, the communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1180 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., HTTP). Similarly, the instructions 1116 may be transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
    a computer-readable medium having instructions stored thereon, which, when executed by a processor, cause the system to:
        for each of a plurality of different entities in a social network structure, wherein each entity is a different attribute for users in a social network, map the entity into a vector having n coordinates based on an embedding, wherein the embedding initially defines that each value stored in the vector for each of the n coordinates is selected randomly from a preset range, wherein each entity is a standardized value for data in the social network structure;
        store the vector for each of the plurality of different entities in a deep representation data structure;
        apply one or more objective functions to at least one combination of two or more of the vectors in the deep representation data structure, causing an objective function output for each of the at least one combination of two or more of the vectors;
        perform an optimization test on each of the at least one combination of two or more of the vectors using a corresponding objective function output for each of the at least one combination of two or more of the vectors;
        determine, for each of the at least one combination of two or more of the vectors, whether the combination passed the optimization test; and
        for any combination that did not pass the optimization test, alter the embedding by changing one or more values coordinates in the vectors in the combination so that the vectors in the combination become closer together within an n-dimensional space, and repeat the performing of the optimization test on the altered vectors, altering the vectors again continually until the optimization test is passed.

2. The system of claim 1, wherein the different entities are entities of a different entity type.

3. The system of claim 1, wherein the preset range is between 0 and 1.

4. The system of claim 1, wherein the optimization test includes, for each combination, examining data in the social network structure to determine whether a first entity corresponding to a first vector in the combination co-occurs in the data with a second entity corresponding to a second vector in the combination.

5. The system of claim 1, wherein at least one of the objective functions is a dot product.

6. The system of claim 1, wherein the optimization test includes feeding a piece of data containing a first entity corresponding to a first vector in the combination and a second entity corresponding to a second vector in the combination to a machine learning model trained to, from entities of a first entity type of the first entity, predict the presence of entities of a second entity type of the second entity, to determine whether the machine learning model accurately predicts the presence of the second entity in the piece of data.

7. The system of claim 6, wherein the piece of data is a member profile.

8. The system of claim 1, wherein the instructions further comprise using distance between the vectors within the n-dimensional space as an indicator of whether a user has a skill represented in the social network structure.

9. A computer-implemented method, comprising:
    for each of a plurality of different entities in a social network structure, wherein each entity is a different attribute for users in a social network, mapping the entity into a vector having n coordinates based on an embedding, wherein the embedding initially defines that each value stored in the vector for each of the n coordinates is selected randomly from a preset range, wherein each entity is a standardized value for data in the social network structure;
    storing the vector for each of the plurality of different entities in a deep representation data structure;
    applying one or more objective functions to at least one combination of two or more of the vectors in the deep representation data structure, causing an objective function output for each of the at least one combination of two or more of the vectors;
    performing an optimization test on each of the at least one combination of two or more of the vectors using a corresponding objective function output for each of the at least one combination of two or more of the vectors;
    determining, for each of the at least one combination of two or more of the vectors, whether the combination passed the optimization test; and
    for any combination that did not pass the optimization test, altering the embedding by changing one or more values coordinates in the vectors in the combination so that the vectors in the combination become closer together within an n-dimensional space, and repeating the performing of the optimization test on the altered vectors, altering the vectors again continually until the optimization test is passed.

10. The method of claim 9, wherein the different entities are entities of a different entity type.

11. The method of claim 9, wherein the preset range is between 0 and 1.

12. The method of claim 9, wherein the optimization test includes, for each combination, examining data in the social network structure to determine whether a first entity corresponding to a first vector in the combination co-occurs in the data with a second entity corresponding to a second vector in the combination.

13. The method of claim 9, wherein at least one of the objective functions is a dot product.

14. The method of claim 9, wherein the optimization test includes feeding a piece of data containing a first entity corresponding to a first vector in the combination and a second entity corresponding to a second vector in the combination to a machine learning model trained to, from entities of a first entity type of the first entity, predict the presence of entities of a second entity type of the second entity, to determine whether the machine learning model accurately predicts the presence of the second entity in the piece of data.

15. The method of claim 14, wherein the piece of data is a member profile.

16. A non-transitory machine-readable storage medium comprising instructions, which when implemented by one or more machines, cause the one or more machines to perform operations comprising:

for each of a plurality of different entities in a social network structure, wherein each entity is a different attribute for users in a social network, mapping the entity into a vector having n coordinates based on an embedding, wherein the embedding initially defines that each value stored in the vector for each of the n coordinates is selected randomly from a preset range, wherein each entity is a standardized value for data in the social network structure;

storing the vector for each of the plurality of different entities in a deep representation data structure;

applying one or more objective functions to at least one combination of two or more of the vectors in the deep representation data structure, causing an objective function output for each of the at least one combination of two or more of the vectors;

performing an optimization test on each of the at least one combination of two or more of the vectors using a corresponding objective function output for each of the at least one combination of two or more of the vectors;

determining, for each of the at least one combination of two or more of the vectors, whether the combination passed the optimization test; and for any combination that did not pass the optimization test, altering the embedding by changing one or more values coordinates in the vectors in the combination so that the vectors in the combination become closer together within an n-dimensional space, and repeating the performing of the optimization test on the altered vectors, altering the vectors again continually until the optimization test is passed.

17. The non-transitory machine-readable storage medium of claim 16, wherein the different entities are entities of a different entity type.

18. The non-transitory machine-readable storage medium of claim 16, wherein the preset range is between 0 and 1.

19. The non-transitory machine-readable storage medium of claim 16, wherein the optimization test includes, for each combination, examining data in the social network structure to determine whether a first entity corresponding to a first vector in the combination co-occurs in the data with a second entity corresponding to a second vector in the combination.

20. The non-transitory machine-readable storage medium of claim 16, wherein the optimization test includes feeding a piece of data containing a first entity corresponding to a first vector in the combination and a second entity corresponding to a second vector in the combination to a machine learning model trained to, from entities of a first entity type of the first entity, predict the presence of entities of a second entity type of the second entity, to determine whether the machine learning model accurately predicts the presence of the second entity in the piece of data.

* * * * *